Dec. 18, 1962 B. V. DAVIS 3,068,713
NUT AND SCREW DRIVE DEVICE OF THE RECIRCULATING BALL TYPE
Filed Oct. 3, 1960 2 Sheets-Sheet 1
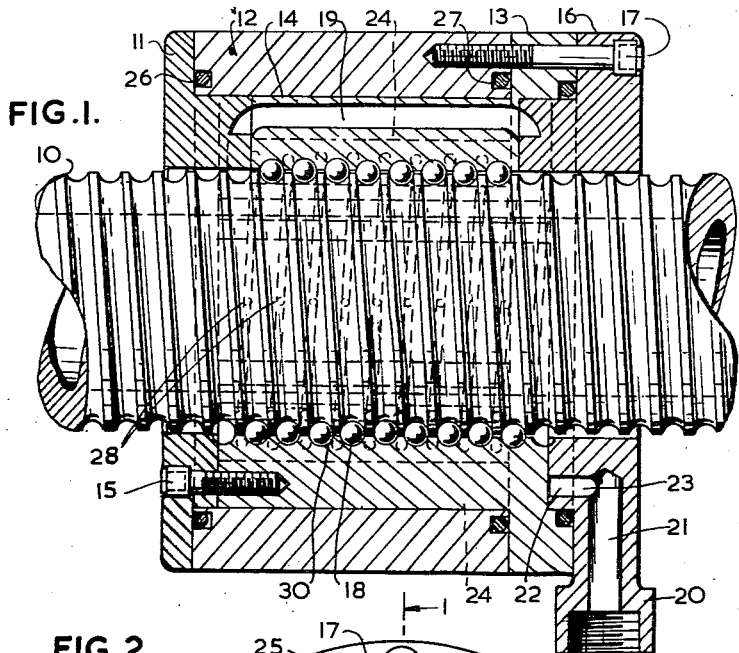
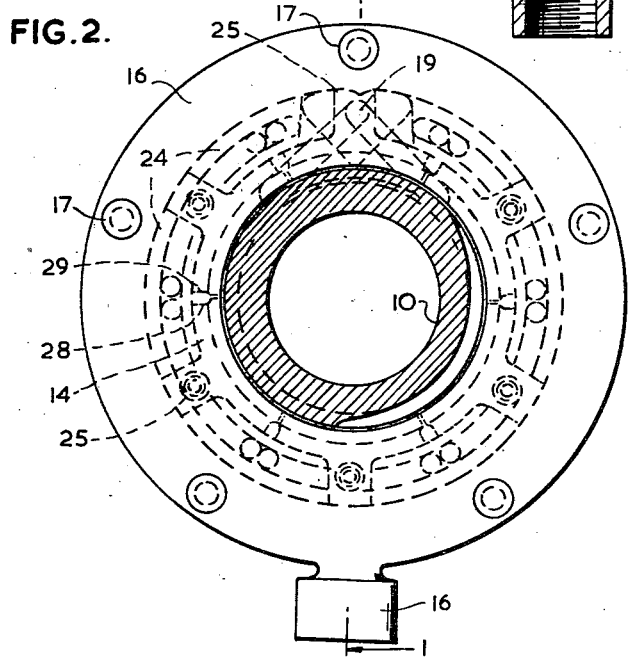
INVENTOR
BERNARD VICTOR DAVIS
BY Whittemore,
Hulbert & Belknap
ATTORNEYS Dec. 18, 1962

B. V. DAVIS 3,068,713

NUT AND SCREW DRIVE DEVICE OF THE RECIRCULATING BALL TYPE

Filed Oct. 3, 1960

INVENTOR
BERNARD VICTOR DAVIS

BY
ATTORNEYS

United States Patent Office 3,068,713
Patented Dec. 18, 1962

3,068,713
NUT AND SCREW DRIVE DEVICE OF THE
RECIRCULATING BALL TYPE
Bernard Victor Davis, Willoughby, England, assignor to National Broach and Machine Co., Detroit, Mich., a corporation of Michigan
Filed Oct. 3, 1960, Ser. No. 59,971
8 Claims. (Cl. 74—424.8)

The invention relates to a nut and screw drive device of the recirculating ball type, and has for its object to provide for cooling the device when for use in conditions in which it would otherwise become undesirably overheated.

According to the invention the nut, or the screw is formed with a chamber adapted to receive a flow of a fluid coolant, and the chamber communicates through at least one duct with the ball-containing zone to deliver the coolant thereto.

Preferably the delivery end of each duct, breaks through a land which separates adjacent turns of the ball half track in the element provided with the chamber.

In the case where it is the nut which is provided with the chamber, the latter can be in the form of an eccentric longitudinal bore, and each duct can extend therefrom in the radially-inward direction of the nut. If the nut in such a case is intended to be supported non-rotatively, and for the screw only to be rotated, the nut can be formed with an external union for conducting the supply of coolant to the chamber.

In the case where it is the screw which is provided with the chamber, the latter can be provided by an axial bore in the screw, one end of the bore being adapted to receive the flow of coolant and the other being sealed, and each duct can be extended from the bore in the radially-outward direction.

The coolant intended to be used for certain applications of the device is $CO_2$ in gaseous form, and in such a case it would be arranged for the gas to be circulated (e.g. by a pump) at a sufficient rate for effecting the desired degree of cooling.

Two embodiments of the invention are now described with reference to the accompanying drawings, in which:

FIGURE 1 is a longitudinal section through a nut and screw drive device according to my specification Serial No. 3,354, filed January 19, 1960, now abandoned, adapted for the nut to receive the flow of coolant, the section being on the line 1—1 of FIGURE 2;

FIGURE 2 is an end elevation looking from the right-hand side of FIGURE 1;

Figure 4:
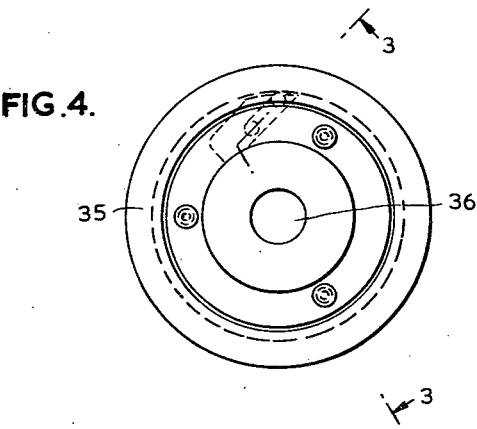
FIGURE 4 is an end elevation from the left-hand side of FIGURE 3.

Referring to FIGURES 1 and 2, the screw is shown at 10 and the nut is shown formed in four coaxial portions 11, 12, 13 and 14. The part 11 spigots into the part 12 and is held by a circle of screws 15 to part 14, and for the purposes of the present invention the nut is provided with an extra end plate 16 which is held up to part 13 by a circle of screws 17. These last-mentioned screws also secure part 13 to part 12.

The screw and the inner periphery of part 14 are provided with coacting, helical half-tracks for the balls 18, and the parts 11 and 13 are provided with the means according to specification Serial No. 3,354, filed January 19, 1960, now abandoned, for circulating the balls through a longitudinal transfer duct 19 in part 14.

The end plate 16 is provided with a radially-outwardly-extending union 20 for connection to an external source of $CO_2$ gas, and a bore 21 of the union communicates with an annulus 22 which is formed in that end of the plate 16 which abuts the part 13. A sealing ring 23 is provided for preventing radially-outward escape of the gas from this vicinity.

Reference to FIGURE 2 shows that the part 14 is provided with longitudinally-extending channels 24 in its outer periphery, leaving between them lands 25 for centering it in the part 12. It will be seen that the ball transfer duct 19 is in one of these lands. These channels are open at one end to the annulus 22 but have their other ends closed by the part 11. Seals 26 and 27 respectively prevent radial outward escape of the gas between parts 11 and 12, and parts 12 and 13.

The bottom of each of the channels 24 is provided with a row of radially-inwardly directed ducts 28 which are fed from the channel through respective restrictors 29 and break through the centre of a helical land 30 separating the turns of the ball half-track in part 14. The ducts 28 of each channel deliver the coolant gas to the whole length of the screw facing them, and as the channels are spaced circumferentially of the screw the latter is subjected to the cooling all round its circumference, the cooling gas delivered through the ducts entering the clearance between the screw and part 14. After it has served its purpose the gas can be allowed to leak out of the ends of the clearance round the screw.

Figure 3:
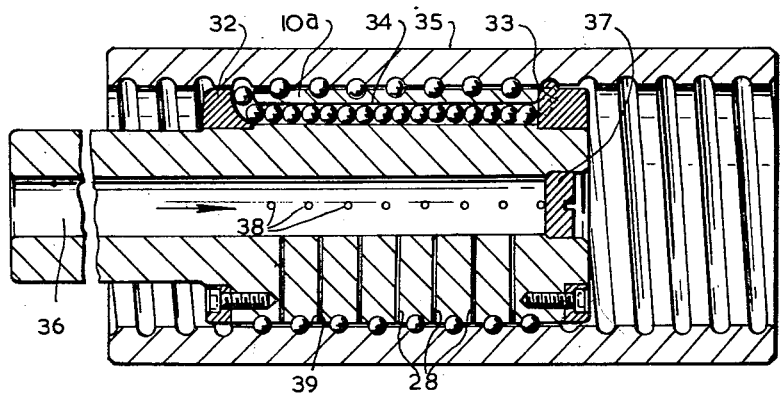
FIGURE 3 is a longitudinal section through a nut and screw device according to the specification of my co-pending application adapted for the screw to receive the flow of coolant, the section being on the line 3—3 of FIGURE 4.

In FIGURES 3 and 4 the screw 10a has reduced-diameter ends forming a shaft on which are arranged parts 32 and 33 provided with means, according to the specification of my co-pending application for transferring the balls through a longitudinal duct 34 in the screw. The nut is shown at 35.

For adapting this construction to the present invention the screw is formed with a coaxial bore 36 of which one end is plugged at 37 and the other adapted for connection to a source of $CO_2$ gas. The bore 36 is provided with angularly-spaced series (two only of which are shown) of ducts 38 which deliver the gas to the centre of the flat-topped, helical land 39 which separates the turns of the ball half-track in the screw. As in the previously described construction the gas can circulate throughout the clearance between the nut and screw and is then allowed to escape out of the ends of the nut.

What I claim is:

1. A drive mechanism of the recirculating ball type comprising a nut member provided with an internal helical groove, a screw member extending through said nut member with clearance therebetween, said screw member including a complementary external helical groove which is adapted to co-operate with the helical groove in said nut member to form a helical guideway, portions of said screw member being reduced in diameter so as to form a pair of axially spaced, outwardly facing shoulders on the outer periphery of said screw member, a pair of collars seated on the reduced portions of said screw member, said collars having faces opposite from and abutting said shoulders, a longitudinally extending ball return passage in said screw member, laterally extending channels formed in the faces of said collars and in the walls of said shoulders which co-operate to form laterally extending passageways which intersect on one end the ends of said ball return passage and on the other end the aforesaid helical guideway, a substantially continuous endless row of balls extending through the return passage, its laterally extending passageways and round the helical guideway, an axially extending bore in said screw member providing a coolant carrying passage therein, one end of said bore being opened and the other end closed, a plurality of radially extending ducts arranged in axially spaced series in said screw member and extending between said bore and the clearance between said nut member and screw member for delivering the coolant in said bore to the aforesaid clearance and the helical guide-way, the aforesaid clearance between the ends of said nut member and screw member providing escape ports for the coolant.

2. A drive mechanism defined in claim 1 wherein the collars are fastened to said screw by a plurality of threaded fasteners.

3. A drive mechanism of the recirculating ball type comprising a nut member of substantially circular cross-section and which is provided with an internal helical groove, a screw member of substantially circular cross-section extending through said nut member with clearance therebetween, said screw member including a complementary external helical groove which is adapted to co-operate with the helical groove in said nut member to form a helical guideway of substantially circular cross-section, portions of said screw member being reduced in diameter to form a pair of axially spaced, outwardly facing shoulders on the outer periphery of said screw member, a pair of annular collars seated on the reduced portions of said screw member, said collars having an outside diameter substantially equal to the diameter of said screw member intermediate said shoulders, said collars also having faces opposite from and abutting said shoulders, a longitudinally extending ball return passage of circular cross-section in said screw member and having an axis parallel to and spaced radially from the axis of said screw member, laterally extending channels formed in the faces of said collars and in the walls of said shoulders which co-operate to form laterally extending substantially curved passageways of substantially circular cross-section which gradually and smoothly intersect on one end the ends of said ball return passage and intersect on the other end the aforesaid helical guideway, a plurality of fasteners between said collars and said screw member for maintaining the faces of said collars in surface-to-surface contact with the shoulders on said screw member, a substantially continuous endless row of balls extending through the return passage, its laterally extending passageways and round the helical guideway, an axially extending bore in said screw member providing a coolant carrying passage therein, one end of said bore being opened and the other end closed, a plurality of radially extending ducts arranged in axially spaced series in said screw member and extending between said bore and the clearance between said nut member and screw member for delivering the coolant in said bore to the aforesaid clearance and the helical guide-way, the aforesaid clearance between the ends of said nut member and screw member providing escape ports for the coolant.

4. A drive mechanism defined in claim 3 wherein the outer ends of said plurality of radially extending ducts break through the lands provided on said screw between the turns of the aforesaid external helical groove.

5. A drive mechanism of the recirculating ball type comprising an outer sleeve, an inner sleeve forming a nut received in said outer sleeve and provided with an internal helical groove, said inner sleeve being in surface-to-surface engagement with the inner periphery of said outer sleeve, a first annular end plate on one end of said sleeves secured to said inner sleeve, a second annular end plate on the other end of said sleeves secured to said outer sleeve, a screw extending through said inner sleeve and plates and provided with clearance therebetween, said screw including a complementary external helical groove which is adapted to co-operate with the helical groove in said inner sleeve to form a helical guide-way, a series of balls in said guide-way said balls being in rolling inter-engagement with said grooves, a plurality of circumferentially arranged, longitudinally extending coolant carrying channels on the outer periphery of said inner sleeve, said channels being separated by longitudinally extending lands which are in surface-to-surface engagement with the inner surface of said outer sleeve, the circumferential width of said lands being substantially smaller than the circumferential width of said channels, said channels being opened at one end and closed at the other end, a plurality of radially extending ducts arranged in axially spaced series in said inner sleeve and extending between said channels and the clearance between said inner sleeve and screw for delivering the coolant in said channels to the aforesaid clearance and the helical guide-way, the clearance between the ends of said inner sleeve and said screw providing escape ports for the coolant, and an axially extending ball return passage formed in one of said lands, the opposite ends of said return passage being connected to the ends of said guide-way.

6. A drive mechanism defined in claim 5 wherein a restriction is provided in each of said ducts.

7. A drive mechanism defined in claim 5 wherein the inner ends of said plurality of radially extending ducts break through the lands provided on said nut between the turns of the aforesaid internal helical groove.

8. A drive mechanism defined in claim 5 wherein one of said end plates is provided with a passage which connects the open ends of said channels with the supply of coolant.

References Cited in the file of this patent

UNITED STATES PATENTS

| | | |
|---|---|---|
| 531,748 | Raymond | Jan. 1, 1895 |
| 1,176,936 | Waldon | Mar. 28, 1916 |
| 1,386,960 | Sharp | Aug. 9, 1921 |
| 2,320,353 | Ernst et al. | June 1, 1943 |
| 2,674,899 | Gobereau | Apr. 13, 1954 |
| 2,853,948 | Aspelin | Sept. 30, 1958 |
| 2,854,296 | Eberle et al. | Sept. 30, 1958 |